United States Patent
Stout et al.

(10) Patent No.: US 9,697,427 B2
(45) Date of Patent: Jul. 4, 2017

(54) SYSTEM FOR AUTOMATICALLY TRACKING A TARGET

(71) Applicant: JIGABOT, LLC, Highland, UT (US)

(72) Inventors: Richard F. Stout, Highland, UT (US); Kyle K. Johnson, Eagle Mountain, UT (US); Donna M. Root, American Fork, UT (US); Kevin J. Shelley, Salt Lake City, UT (US)

(73) Assignee: Jigabot, LLC., Highland, UT (US)

( * ) Notice: Subject to any disclaimer, the term of this patent is extended or adjusted under 35 U.S.C. 154(b) by 153 days.

(21) Appl. No.: 14/502,156

(22) Filed: Sep. 30, 2014

(65) Prior Publication Data

US 2015/0206012 A1 Jul. 23, 2015

Related U.S. Application Data

(60) Provisional application No. 61/965,048, filed on Jan. 18, 2014, provisional application No. 61/965,444, filed on Jan. 30, 2014, provisional application No. 61/965,967, filed on Feb. 10, 2014.

(51) Int. Cl.
*G06K 9/00* (2006.01)

(52) U.S. Cl.
CPC .............. *G06K 9/00711* (2013.01); *G06K 2009/00738* (2013.01)

(58) Field of Classification Search
None
See application file for complete search history.

(56) References Cited

U.S. PATENT DOCUMENTS

| | | | |
|---|---|---|---|
| 5,008,804 | A | 4/1991 | Gordon |
| 5,179,421 | A | 1/1993 | Parker et al. |
| 5,268,734 | A | 12/1993 | Parker et al. |
| 5,331,359 | A | 7/1994 | Leclercq |
| 5,517,300 | A | 5/1996 | Parker et al. |
| 5,790,124 | A | 8/1998 | Fischer et al. |
| 5,912,700 | A | 6/1999 | Honey |
| 6,094,221 | A | 7/2000 | Andersion |
| 6,484,148 | B1 | 11/2002 | Boyd |
| 6,608,688 | B1 | 8/2003 | Faul et al. |
| 6,618,010 | B2 | 9/2003 | Arndt |
| 6,769,771 | B2 | 8/2004 | Trumbull |
| 6,801,637 | B2 | 10/2004 | Voronka et al. |

(Continued)

OTHER PUBLICATIONS

Solotshot 1, Instruction Manual. Accessed May 13, 2017. Project launched on Kickstarter Jul. 16, 2012.*

(Continued)

*Primary Examiner* — Nirav G Patel
(74) *Attorney, Agent, or Firm* — Workman Nydegger (57) ABSTRACT

A method for tracking a cinematography target that has been associated with an emitter can comprise receiving an indication to track a particular identifier. The particular identifier can be associated with an object of interest. The method can further comprise identifying, using at least one tracker component, a direction associated with the particular identifier. The method can also include calculating a motor actuation sequence necessary to actuate a control component to track the object of interest with an audiovisual device. The method can further comprise actuating at least one motor to track the object of interest.

18 Claims, 6 Drawing Sheets

(56) References Cited

U.S. PATENT DOCUMENTS

| | | | |
|---|---|---|---|
| 7,071,898 | B2 | 7/2006 | Hobgood et al. |
| 7,312,872 | B2 | 12/2007 | Ohta |
| 7,468,778 | B2 | 12/2008 | Thomas et al. |
| D627,744 | S | 11/2010 | Yano |
| D630,168 | S | 1/2011 | Yano |
| 8,031,227 | B2 | 10/2011 | Neal et al. |
| 8,208,067 | B1 | 6/2012 | Singh |
| D708,796 | S | 7/2014 | Sproviero |
| D723,477 | S | 3/2015 | Bruggemann |
| D732,484 | S | 6/2015 | Bruggemann |
| 2002/0176603 | A1* | 11/2002 | Bauer ................. G01S 1/70 382/103 |
| 2003/0003925 | A1 | 1/2003 | Suzuki |
| 2003/0088179 | A1 | 5/2003 | Seeley |
| 2003/0095186 | A1 | 5/2003 | Aman |
| 2006/0262961 | A1 | 11/2006 | Holsing et al. |
| 2007/0109213 | A1 | 5/2007 | Takahashi |
| 2007/0139163 | A1 | 6/2007 | Powell |
| 2008/0110977 | A1 | 5/2008 | Bonalle |
| 2008/0297304 | A1 | 12/2008 | Moscovitch |
| 2008/0297587 | A1* | 12/2008 | Kurtz ............. G06K 9/00335 348/14.08 |
| 2009/0046152 | A1 | 2/2009 | Aman |
| 2009/0048039 | A1 | 2/2009 | Holthouse |
| 2009/0096664 | A1 | 4/2009 | Carroll |
| 2010/0026809 | A1 | 2/2010 | Curry |
| 2010/0109847 | A1 | 5/2010 | Noel |
| 2010/0214071 | A1 | 8/2010 | Nagai |
| 2010/0238262 | A1 | 9/2010 | Kurtz |
| 2011/0169959 | A1 | 7/2011 | De Angelis |
| 2011/0214619 | A1 | 9/2011 | Risch |
| 2011/0228098 | A1 | 9/2011 | Lamb et al. |
| 2012/0069178 | A1 | 3/2012 | Nielsen |
| 2012/0192995 | A1 | 8/2012 | Chen |
| 2012/0232958 | A1 | 9/2012 | Silbert |
| 2013/0182225 | A1 | 7/2013 | Stout |
| 2013/0229529 | A1 | 9/2013 | Lablans |
| 2013/0271602 | A1 | 10/2013 | Bentley |
| 2014/0023195 | A1 | 1/2014 | Lee |
| 2014/0074667 | A1 | 3/2014 | Smith |
| 2014/0098241 | A1 | 4/2014 | Stout et al. |
| 2014/0169758 | A1 | 6/2014 | Sapoznikow |
| 2014/0365640 | A1 | 12/2014 | Wohl |
| 2015/0057111 | A1 | 2/2015 | Tremblay |
| 2015/0248917 | A1 | 9/2015 | Chang |

OTHER PUBLICATIONS

U.S. Appl. No. 13/744,230, Jan. 26, 2015, Notice of Allowance.
U.S. Appl. No. 14/508,813, filed Oct. 7, 2014, Stout et al.
U.S. Appl. No. 29/503,885, filed Sep. 30, 2014, Shelley et al.
U.S. Appl. No. 14/504,634, filed Oct. 2, 2014, Stout et al.
U.S. Appl. No. 14/507,494, filed Oct. 6, 2014, Stout et al.
Mase et al.; Interaction Corpus and Experience Sharing; ATR Media Information Science Laboratories; Nagoya University; Kyoto University; Jan. 2003.
Papanikolopoulos, et al.; Visual Tracking of a Moving Target by a Camera Mounted on a Robot: A Combination of Control and Vision; IEEE Transactions on Robotics and Automation; vol. 9, No. 1; Feb. 1993.
Svoboda et al.; "A Convenient Multi-Camera Self-Calibration for Virtual Environments," Center for Machine Perception; Department of Cybernetics; Czech Technical University in Prague; Aug. 14, 2005.
International Search Report and Written Opinion in corresponding Application No. PCT/US14/11094 dated Jun. 6, 2014.
Non-Final Office Action in U.S. Appl. No. 14/045,445 mailed on Jan. 26, 2017.
Final Office Action in U.S. Appl. No. 14/045,445 mailed on Mar. 18, 2016.
Non-Final Office Action in U.S. Appl. No. 14/507,494 mailed on Feb. 24, 2017.
Non-Final Office Action for U.S. Appl. No. 14/502,156 mailed on Jun. 30, 2016.
Notice of Allowance in U.S. Appl. No. 29/503,885 mailed on Sep. 16, 2015.
Non-Final Office Action in U.S. Appl. No. 14/589,565 mailed on Mar. 23, 2017.

* cited by examiner

SYSTEM FOR AUTOMATICALLY TRACKING A TARGET

CROSS-REFERENCE TO RELATED APPLICATIONS

This application claims priority to U.S. Provisional Patent Application Ser. No. 61/965,048 filed on Jan. 18, 2014, entitled "INTEGRATING NATIVE VIDEO WITHIN A TRACKING SYSTEM," and to U.S. Provisional Patent Application Ser. No. 61/965,444 filed on Jan. 30, 2014, entitled "GRID & ANGULAR DATA TRACKING WITHIN A TRACKING SYSTEM," and to U.S. Provisional Patent Application Ser. No. 61/965,967 filed on Feb. 10, 2014, entitled "3D VISION AND FACIAL TRACKING." All the aforementioned applications are incorporated by reference herein in their entirety.

BACKGROUND OF THE INVENTION

1. Technical Field

The present invention relates generally to automated tracking systems.

2. Background and Relevant Art

Recently, with the market arrival of low cost, high quality digital recorders, many non-professional and professional consumers have increasingly used recorders to document a variety of different events. For example, many consumers create films of themselves or others performing extreme sports, such as rock climbing, skydiving, motor cross, mountain biking, and other similar activities. Similarly, consumers are able to create High Definition quality films of family events, such as reunions, sporting events, graduations, and other similar memorable events. Additionally, digital video recorders have also become more prevalent in professional and industrial settings. For example, many law enforcement departments have incorporated video recorders into police cruisers.

While recent advances in film and video creation and production have allowed consumers and professionals to easily create high quality videos of various events, it can still be difficult for consumers and professionals to acquire the quality and perspective that they may desire in their footage, in particular, in single operator situations. For example, an individual may desire to record him- or herself snowboarding down a particular slope. One will understand the difficulty the individual would have in simultaneously filming themselves from a third person perspective, such as when they are skiing past a camera that is being swiveled on a tripod by an operator to keep them "in frame." Similarly, a police officer may desire to record their interactions with the public, but a dash-mounted recorder only provides a limited and static field of view.

Accordingly, there is a need for systems, methods, and apparatus that can gather video footage of desired events and individuals without requiring direct and continual user interaction with the recording device.

BRIEF SUMMARY OF THE INVENTION

Implementations of the present invention comprise systems, methods, and apparatus configured to automatically track one or more specific targets. In particular, implementations of the present invention can utilize one or more external tracking devices to track the movements of the one or more specific targets. Additionally, in at least one implementation, the tracking system can also include one or more cameras that can provide tracking data to the tracking system.

In one implementation, a system for tracking a cinematography target can use multiple components to identify and track the target. The system can comprise an emitter configured to attach to a target and to emit a tracking signal. The emitter can comprise an output module configured to emit the tracking signal that comprises one or more identifiable signals. The system can also comprise a tracker configured to receive the tracking signal from the emitter and to track the emitter based upon the received tracking signal. The tracker can comprise a receiver module configured to receive the tracking signal and to identify the one or more identifiable signals. The system can comprise a control module configured to identify a location of the target and to position an audiovisual device to align with a target. The system can further comprise a user interface device configured to receive commands from a user and communicate the commands to the tracker.

Additionally, in at least one implementation a method for tracking a cinematography target that has been associated with an emitter can comprise receiving an indication to track a particular identifier. The particular identifier can be associated with an object of interest. The method can further comprise identifying, using at least one tracker component, a direction associated with the particular identifier. The method can also include calculating a motor actuation sequence necessary to actuate a control component to track the object of interest with an audiovisual device. The method can further comprise actuating at least one motor to track the object of interest.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and apparatus configured to automatically track one or more specific targets. In particular, implementations of the present invention can utilize one or more external tracking devices to track the movements of the one or more specific targets. Additionally, in at least one implementation, the tracking system can also include one or more cameras that can provide tracking data to the tracking system.

Accordingly, one or more implementations of a system for automatically tracking a target include using an external and independent tracking device, referred to herein as a emitter location generator ("ELG"), to track the target and then forward the tracking information to a physically separate control module. As used herein, an ELG refers primarily to a tracking device that is not physically integrated into the same unit as the control device and/or the audiovisual device. When describing the various features of the ELG and/or the tracking device, one will appreciate that the described features can be included within either device and function as described. For the sake of brevity and clarity, however, some features will only be described with respect to an ELG or a tracking device. In contrast, in some cases a "tracking system" will be used to describe both a tracking device and an ELG, either in combination or separately.

In at least one implementation, multiple ELGs can be communicating tracking information to a control module. For example, multiple ELGs can be located along a path that the target will be traversing. Each of the ELGs can independently, or cooperatively, communicate tracking information relating to the target to one or more control units. The one or more control units can rely upon the received information to track the target along the path.

In additional implementations, an audiovisual reception device can be integrated into the tracking device. This is in contrast to other implementations where the audiovisual device is not physically integrated into the tracking device, but is instead attached to system that includes a control module. Accordingly, in at least one implementation, an audiovisual device (e.g., a camera, a microphone, etc.) is integrated into the tracking device. The audiovisual device can be a primary or secondary information receiver for the tracking device. For example, a camera can be integrated into the tracking device, and the camera can provide the necessary information for tracking the target. Additionally, in at least one implementation, the camera can both track the target and record the target. Whether integrated or separate, at least one implementation of the present invention provides a system that automatically tracks a target and keeps the target within frame of an audiovisual device.

Additionally, in at least one implementation, a system for automatically tracking a target can include two cameras either physically integrated into the system or attached to the system as separate devices. The two cameras can provide additional visual benefit to the system. For example, using two cameras, the system can gather information relating to depth. Additionally, recording a target with two cameras can create video data that can later be converted into a three-dimensional video format.

Figure 1:
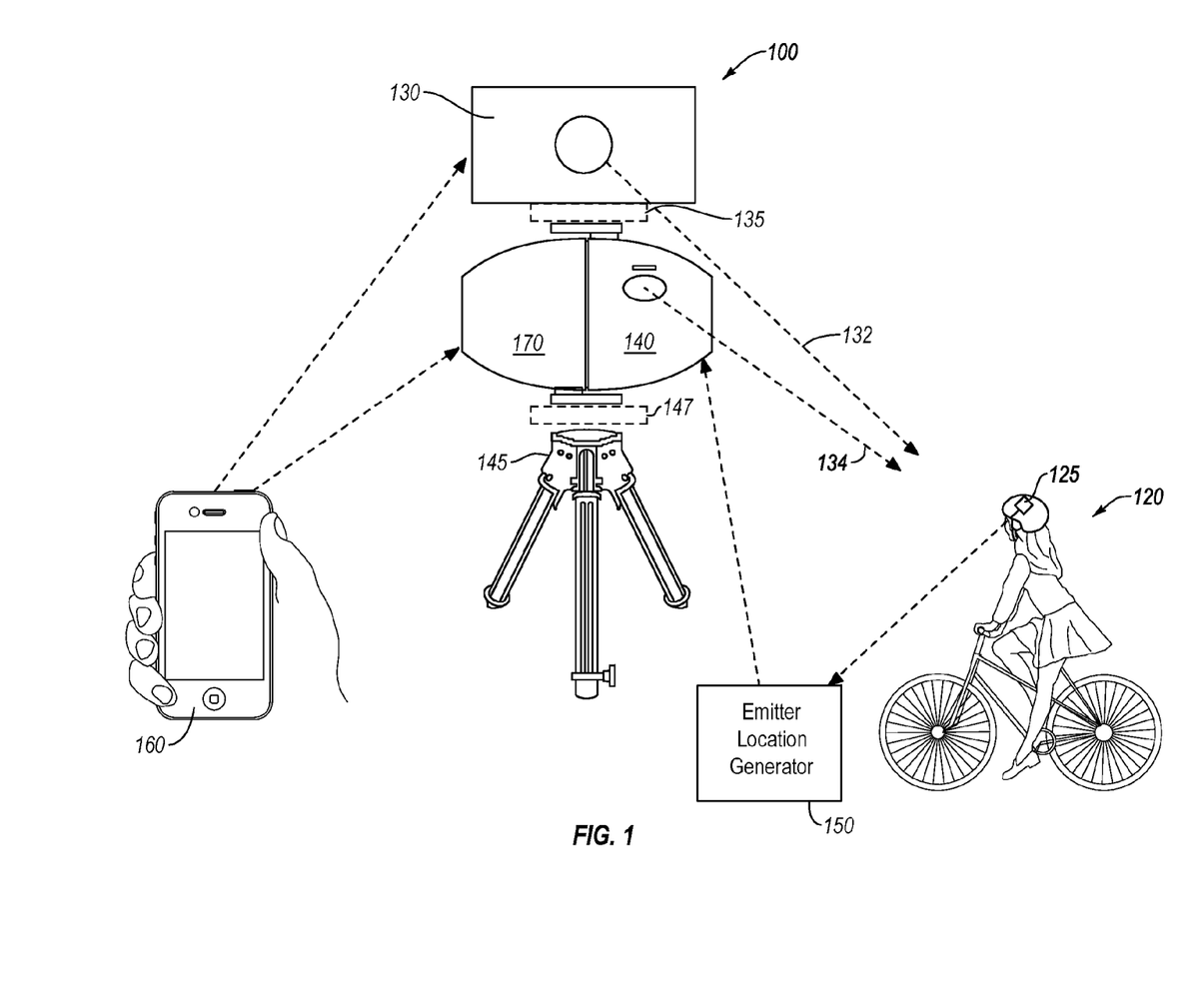
FIG. 1 illustrates a diagram of an implementation of a tracking system and a target in accordance with an implementation of the present invention.

Turning now to the figures, FIG. 1 depicts a tracking system 100 tracking a bicycle rider 120. In the depicted implementation, the tracking system 100 includes an emitter 125, an emitter locator generator ("ELG") 150, a tracking device 140, a stabilization device 145, a portable computing device 160, a control device 170 and in some implementations a camera 130. The camera 130, as shown, can comprise a $3^{rd}$ party camera that is attached to tracking system 100 through a standard mounting device 135, similar to how a camera 130 would be mounted to a tripod. In other implementations, however, the camera 130 can be physically integrated into the tracking system 100.

In any case, the camera 130, or any other mounted device (e.g., microphone, light, etc.), may thus face directly toward the target object 120 (bicycle rider), as illustrated by arrow 132. This is facilitated because the tracking device 140 may also be facing directly towards the target object 120, as illustrated by arrow 134. In particular, as the target object 120 moves, the tracking device 140 can direct the control device 170 to rotate, swivel, and pivot to track the target object 120. The control device 170 can thus track a target object 120 as the object moves in any direction within 3D space. As the control device 170 moves to track the target object 120, the tracking device 170 can also cause the camera 130 to move, such that the tracking the target object 120 remains within frame in the camera, even though the target object 120 is moving.

In at least one embodiment, the tracking device 140 is configured to track a particular emitter 125 that is attached to the tracking object 120. An emitter 125 can emit a particular light pattern, radio frequency pattern, or other form of electromagnetic wave. In at least one implementation, an emitter 125 can be configured to emit a particular signal from a collection of possible signals. The tracking device 140, in turn, can be configured to identify that particular signal. In this way, a tracking device 140 can identify the particular emitter 125 even if multiple emitters 125 are simultaneously operating using a variety of different signals.

In at least one implementation, an ELG 150 can be used, in place of or in combination with a tracking device 140, to track a target object 120. The ELG 150 can comprise the necessary components and structure to receive and track the particular signal from an emitter 125. In particular, the ELG 150 can comprise components necessary to rotate, pivot, and tilt, such that the ELG 150 can physically track a moving target object. For example, in at least one implementation, the tracking system 100 may comprise a camera 130 (either physically separate or integrated) with a control device 170 that is in communication with an ELG 150. In this particular example, the externally located ELG 150 can replace the integrated tracking device 140. As the ELG 150 detects and tracks the movement of a target object 120, the ELG 150 can communicate information to the control device 170 that enables the control device 170, and in turn the audiovisual device, to also track the target object 120.

Further, in at least one implementation, multiple ELGs 150 can be utilized to track a single target object 120. For example, if a user desires to track a skier as the skier descends down a particular ski trail, the user can position a camera 130 and attached control device 170 such that the camera can record a desired portion of the ski trail. The user can then position ELGs along the path such that the ELGs can collectively communicate to the control device 170 information regarding the relative location of target object 120. One will understand that utilizing multiple ELGs in some cases may provide higher quality location information than using a single tracking device 140. In at least one implementation, a tracking device 140 can also be used in conjunction with one or more ELGs.

Turning now to the control device 170, in at least one implementation, the control device 170 can be attached via another mount 147 or grip adapter, to a grip device 145 such as a tripod or any number of other devices. The mount or adapter 147 may be especially designed to couple both with the control device 170 and a particular grip device 145 such as a particular dolly, a bike, a helmet, and/or so on. Thus the control device 170 may be attached to a grip device 145 which may be stationary or moving in any direction of 3D space. Accordingly, whether the grip device 145 is static (e.g., a stationary tripod) or moving (e.g., a bike helmet), or the tracking object 216 is static or moving, the control device 170 may track the target object 120 and the audio-visual reception device (e.g., a camera 130) can also continue to track the target object 120.

Additionally, in at least one implementation, a UI device 160, such as a smartphone or tablet or computer or other device, may be capable of communicating with the tracking system 100. In particular, in at least one implementation, the UI device 160 can communicate with the audiovisual reception device 130, the control device 170, the tracking device 140, the grip device 145, an ELG 150, and/or an emitter 125. The UI device 160 can be either a customized device manufactured specifically to communicate with the tracking system 100 or it can be a general purpose computing device that has been configured to interact with the tracking system 100. Additionally, in at least one implementation, the UI device 160 can be physically integrated into the tracking system 100.

The UI device 160 can provide a user with various abilities to control and customize the tracking system 100. For example, a user may, via a UI device 160, create a "script" or execute a script that "tells" the tracking system 280 to run in a particular way, under certain circumstances. For instance, the UI device 160 may provide a user with an option to select a script for tracking a skateboarder. Upon selecting the script, through the UI device 160, the UI device 160 can communicate the script to the tracking system 280, which can then execute the script that includes specific tracking and control information that is configured to aid in tracking a typical skateboarder.

Accordingly, one or more implementations of a tracking system 100 provide a user with the ability to track a target object 120 that has been associated within an emitter 125. Additionally, implementations of the system provide a UI device 160 that allows a user to provide various instructions and commands to the tracking system 100. As such, implementations of the present system allow a user to automatically gather audiovisual data without requiring the expense of specific filming professionals.

Figure 2:
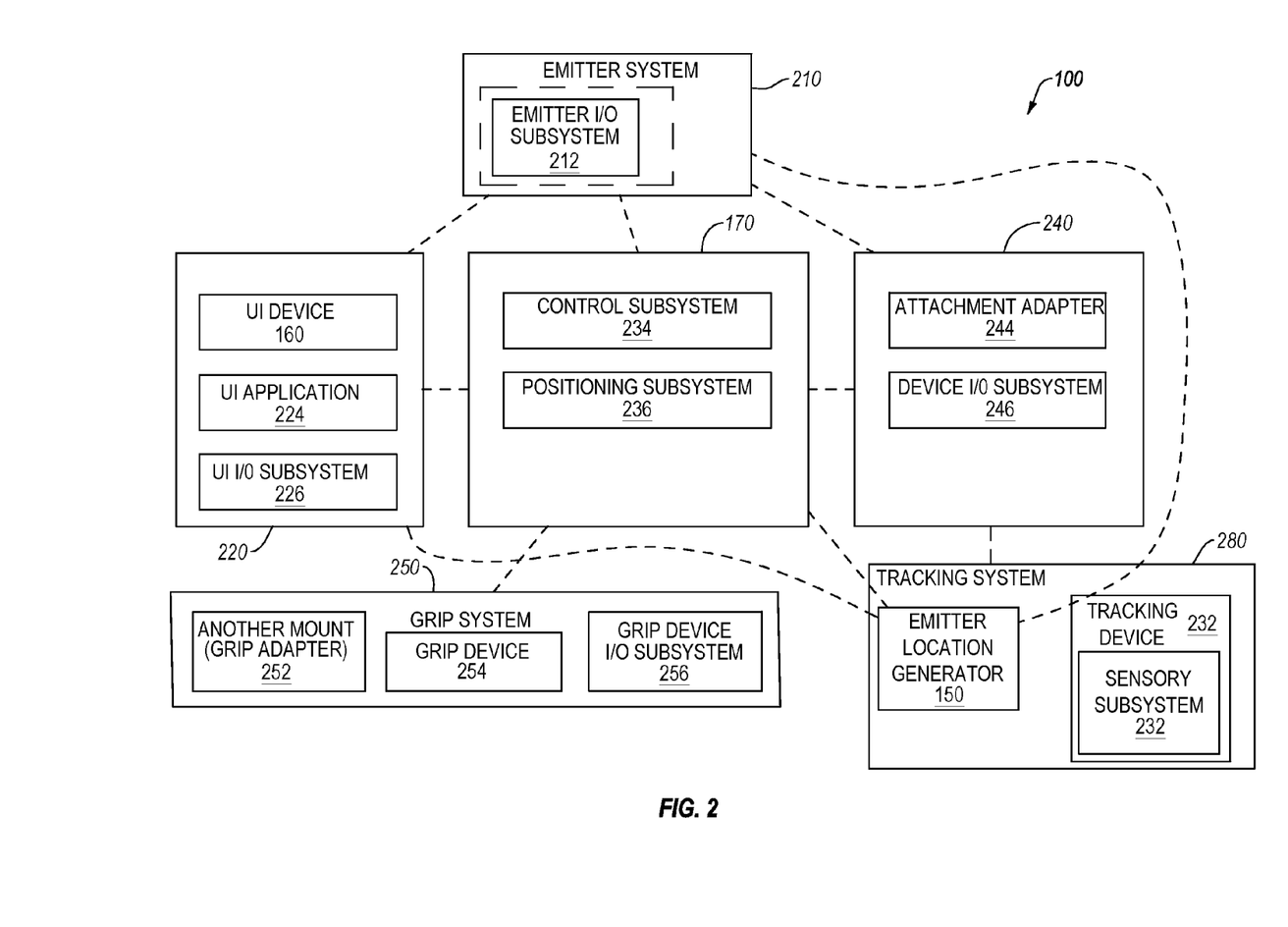
FIG. 2 illustrates a schematic diagram of a system for tracking a target in accordance with an implementation of the present invention.

FIG. 2 is a schematic illustration of the tracking system 100 of FIG. 1. Specifically, FIG. 2 depicts an emitter system 210, a UI system 220, a tracking device 140, a mounting system 240, a grip system 250, and an ELG 150. Each of the listed systems further includes additional sub-modules that will be discussed further herein. One will understand, however, that the use of modules and sub-modules is somewhat arbitrary and are only provided for the sake of clarity and explanation. In alternate embodiments, various modules and/or sub-modules may be combined or otherwise divided.

As depicted in FIG. 2, a tracking system 280 can include both an ELG 150 and a tracking device 140. In at least one implementation, the tracking system 280 can comprise one or more ELGs 150 and/or one or more tracking devices 140, either in combination or individually. The ELG 150 and the tracking device 140 may both send signals to and receive sensor or signal data from the various modules of the tracking system 100. In particular, the data generated by the ELG 120 and the tracking device 140 allows the control device 170 to know how to tilt or swivel to point at the target object 120 or the emitter 125.

The emitter system 210 can comprise an emitter I/O subsystem 212 and can be attached to a target object 120. In at least one embodiment, the emitter I/O subsystem 212 may include RAM, a processor, a Wi-Fi transceiver, a power source, and other common computer components—all effective to enable the emitter device 214 to be configured and otherwise controlled directly or from the UI system 220. Additionally, the emitter system 210 can include functionality to pulse according to a unique and pre-configured or use-selectable/configurable pulse rate or modulation mode, and thus to communicate with the tracking system 280 via a transceiver in both the emitter system 210 and the tracking system 280.

In at least one implementation, the emitter I/O subsystem 212 allows one or more emitters 215 to be turned on or off, began or stopped from emitting or signaling, modulated or pulsed or otherwise controlled in such a way as to be uniquely distinguishably by the tracking system 280. The emitter I/O subsystem 212 may also receive signals from or send signals to the UI system 220, the tracking system 280, or the mounting system 240 directly, through the tracking system 280, through the UI systems 220, or through the grip system 250.

The emitter system 210 can include a type of infrared light (such an LED), a supersonic audio emitter, a heat emitter, a radio signal transmitter (including Wi-Fi and Bluetooth), RFID, or some other similar emitter device or system or subsystem. Additionally, the emitter system 210 can be an passive system such as a reflective surface from which a color of shape can be discerned by the sensory subsystem 232. In at least one embodiment, one or more emitters 125 modulate, pulse, or otherwise control emitted signals or light (visible or non-visible, such as infrared), or sounds, or thermal radiation, or radio transmissions, or other kinds of waves or packets or bundles or emissions, in order to be discernible to a tracking system 280. The tracking system 280 may communicate with the emitter 125 through the UI system 2, the emitter I/O subsystem 212, or both, in order to enhance, clarify or modify such emissions and communications from one or more emitter devices 125.

In at least one embodiment, the emitters 125, can be embedded within clothing (such as sport team jerseys, ski jackets, production wardrobe, arm bands, head bands, etc.), equipment (such as football helmets, cleats, hang gliders, surfboards, etc.), props (glasses, pens, phones, etc.), and the like, in order to hide the emitter device 215 from being obviously visible to spectators. For example, small emitter devices 215 can be hidden beneath a logo, or integrated with a logo, so as to be minimally visible. In contrast, fashion accessories, such as hats, shirts, shorts, jackets, vests, helmets, watches, glasses, may well be fitted with emitter devices 214, such that the device is visible and obvious, and acceptably so, for its "status symbol" value. To allow for a small emitter device 214 size, micro batteries and other power sources may be used to power the emitter devices 214.

Target objects 120, such as people, animals, machines, or objects (e.g., cars or balls), may all be fitted with emitters 125, but need not be in order to be trackable by a tracking system 280. In any case, at least one embodiment of an emitter 125 allows for a target object 120 to effectively signal or emit its presence, as it moves about.

In at least one implementation, the typical ways in which a target object 120 is predicted to move may be known to the UI system 220, via user and embedded system algorithms (e.g., scripts). Thus, as the target object 120 moves about, the tracking system 280, which communicates with and may be configured or programmed by the UI system 220, can tilt or swivel, or move in 3D space, in order to follow and track the target object 120, according to a user's preferences or predefined activity configurations or programmed scripts. As the tracking system 280 thus tracks the target object 120, the control device 170 and associated audiovisual device 130 (be it a camera, light, or microphone), also follows the target object 216 in synchronous motion as well as in ways and patterns "predicted" in part by how the user configure the tracking system 100.

The UI system 220 includes a user interface device 160 (such as a smartphone or other computer 12 device), a user interface application (app) 224, and a user interface I/O subsystem 226. Specifically, the I/O subsystem 226 can enable the UI system 220 to communicate within the tracking systems 100 and to various associated devices. In at least one embodiment, the user interface device 160 runs the user interface app 224 and communicates through the user interface I/O subsystem 226, which is typically embedded within and is a part of the user interface device 160. The user interface app 226 can provide an interface to configure one or more emitter devices 214, tracking system 280, and/or mounted devices 242 and to automate activities within the tracking system 200 via scripts. The user interface application 224 may be programmed to perform other features of sensory input and analysis beneficial to some other system 200, as well as to receiving user tactile input and communicating with the tracking system 280 or the mounting system 240 of the immediate system 200.

In at least one embodiment, the user interface app 224 may also allow a user to specifying from a list, the kind of activity that a target object 120 is participating in (jumping on a trampoline, walking in circles, skiing down a mountain, etc.). The list can be revised and expanded to include additional activities defined by a user or downloaded to the user interface app 224. Once selected the UI system 220 can communicate the selected activity (i.e., script) to the tracking system 280 and/or control device 170, which can then adjust its tracking based upon the instructions in the script.

The user interface app 224 may additionally allow users to diagram the activities expected by the target object 120, define an X and Y grid offset for the tracking of the emitter device 125 by the tracking system 280, specify an offset by which the user wants the action to be "led" or "followed," etc. (if tracking other than just by centering the emitter device 125 within the field of view of the tracking system 280.) For example, the tracking system 280 may generally follow the emitter 125 by biasing its centering of the target object 120 in some manner pleasing to the user. The user interface app 224 may additionally enable interpretation, change, or control of the identification signal (or emitted, modulated signal) or the emitter 125.

The user interface app 224 may additionally enable updating of one or more of the UI system 220, tracking system 280, mounting system 240, emitter system 210, or other computers connected to the tracking system 100. Additionally, the user interface app 224 may provide for execution of unique and novel formulas or algorithms or scripts or configuration data, enabling improved functioning of the tracking system 280 or other systems within the tracking system 100. For example, a user may be able to download a particular script that is directed towards tracking basketball players or a script that is directed towards tracking scuba divers.

Turning now to the tracking system 280, both the tracking device 140 and the ELG 150 may include one or more sensory subsystems 232. The sensory subsystem 232 may be comprised of one or more sensors or receivers including infrared, RF, ultrasonic, photographic, sonar, thermal, image sensors, gyroscopes, digital compasses, accelerometers, and/or similar sensors. In at least one embodiment, the sensory subsystem 232 includes one or more cameras that produce data that can be analyzed for tracking purposes.

Additionally, the sensory subsystem 232 may be designed specifically to identify more than one emitter device 214 simultaneously. Further, the sensory subsystem 232 may be capable of identifying multiple emitter devices 125 that are of the same signal or modulation or pulse rate, or of different signals or modulations or pulse rates.

If multiple emitter devices 125 are of the same signal, modulation, or pulse rate, they may be perceived by the sensory subsystem 232 as a single point source. In particular, the sensory subsystem 232 may accumulate the multiple emitter devices 125 into a single point source by means of a weighted average of each location of each individual identified emitter 125, by weighing certain emitters 125 more heavily than others before looking at an average of locations of all identified emitters 125, or by looking at only the location of certain emitters 125. In any case, at least one implementation of the sensory subsystem 232 is able to combine the multiple emitters 125 to represent a single "point cloud" with multiple, similar signals, modulations, or pulse rates.

In contrast to the above, if multiple emitter devices 125 are of different signals, modulations, or pulse rates, they may be perceived by the sensory subsystem 232 as distinct from each other. The sensory subsystem 232 can convert each perceived emitter location to an X and Y position on a two-dimensional grid. This information can then be used by the control device 170 to actuate the tracking system 100.

The two dimensional grid may be understood as an image sensor onto which light is focused by lenses, as in a camera system, of which the sensory subsystem 232 may be a kind. The image sensor may be a two-dimensional plane, which is divided by units of measurement X in its horizontal axis, and Y on its vertical axis, thus becoming a kind of measurement grid. Several times per second (perhaps 24, 30, or 60 or some other common video frame rate), the location of each unique emitter device 125 or of each "point cloud" may be given an X and Y coordinate representation, which may be represented as two integer numbers.

In at least one embodiment, the control device 170 uses the X and Y coordinate data to calculate (via the control device 170) a distance from a center X and Y position, in order to then position tilt- and swivel-motors via a positioning subsystem 236 to "center" the emitter device 214 within its two-dimensional grid. The net effect is that the control device 170 can tilt and swivel until it is "facing" the emitter device 125 or emitter device 125 "point cloud."

In an alternate embodiment, several times per second the tracking system 280, identifies an X and Y coordinate for each emitter 125, or "point cloud" (cloud) of emitters 125. These X and Y coordinates can be saved as a history of coordinates (perhaps appended to a data array unique to each emitter 125 or emitter device 125 cloud) by the control subsystem 234. Over time, these data arrays represent a history of travel of the emitter device 125 or cloud. These data arrays can also be analyzed by a control subsystem 234, possibly based upon configuration data that may come from the UI system 220, in order to "fit" their data history into mathematical curves or vectors that approximate the array data history of travel, and also "predict" X and Y coordinates of future travel. In this manner (and in similar ways) the tracking system 280 may thus obtain and analyze data whereby it might "learn" how to better track the target object 120 and the emitter 125 over time or in similar situations in the future.

Accordingly, in at least one implementation, the control subsystem 234 may control a positioning subsystem 236, and its tilt and swivel motors, in a partly "predictive" manner, that "faces" the audiovisual device 130 at the emitter device 125 or cloud over time. This may be particularly useful in cases where the emitter device 125 is partly or fully obscured for at least a period of time. The net effect of a "learning" and "predictive" tracking capability may yield a more "responsive" and "smooth" tracking activity than would be the case with the simple embodiment or tracking/centering approach alone. The control subsystem 234 may employ other unique and novel mechanisms to smooth the tilt and swivel motors of the positioning subsystem 236 as well, including using unique mathematical formulas and other data gathered via I/O subsystems 246, 226, 212 or those of other tracking systems 200.

Turning now to the mounting system 240, the mounting system 240 can include an attachment adapter 244 (which enables different devices to be adapted for mounting quickly and easily), and a device I/O subsystem 246, which enables communication and control of the audiovisual device 130 via a tracking system 280, UI system 220, or emitter I/O subsystem 212, or some combination of these, including other systems and subsystems of other tracking systems 200. In at least one implementation, data from the audiovisual device 130 may also be provided to the tracking system 180, the UI system 220, and/or the emitter system 210.

The audiovisual device 130 can be affixed via the attachment adapter 244 to a tracking device 140, such that the audiovisual device 140 may be tilted or swiveled in parallel with the tracking device 140, thus always facing the same direction as the tracking device 140. In additional embodiments, discussed herein, the audiovisual device can be physically integrated into the tracking device 140, such that the tracking device 140 receives tracking information from the audiovisual device 130. In contrast, in at least one implementation, the tracking device 140 can be physically separate from the audiovisual device 130 (e.g., an ELG 150). Additionally, the audiovisual device 130 may be controlled via the device I/O subsystem 246 and perhaps also via the UI system 220 or the tracking system 280). In at least one embodiment, the audiovisual device 130 can be controlled by any of the above described systems, such that the audiovisual device can be controlled while the tracking system 280 and the control device 170 are performing various operations.

The control subsystem 232 can receive information from any other device of system 100 including emitter systems 210, UI systems 220, grip systems 250, mounting systems 240, or even tracking devices 125 which may be implemented in alternative embodiments that have been shown herein. For example, a UI device 160 may be used to provide data via UI I/O subsystem 226 to the control subsystem 234 effective for controlling the positioning subsystem 236.

Turning now to the ELG 150, the ELG 150 may both send signals to and receive sensor or signal data from emitter 125, which may be an RFID device. Additionally, in at least one implementation, there may be more than one ELG 150. The more than one ELG's 150, in at least one implementation, may communicate with each other to aid in triangulating the location of an emitter 215 or of other ELG 150 devices. In addition to dedicated ELG devices 150, other devices or related subsystems of tracking system 100, such as a UI Device 160, a mounting system 240, a grip system 250, or other device may also serve as ELG devices 150.

In at least one implementation, the ELG device 150 can identify the location of the emitter 215 within a given geographic area. The ELG 150 can utilize triangulation with other ELG 120 devices, GPS, visual data, radio frequency data, sensory data analysis, or by some combination of these things. Once the location is determined, the ELG 150 can provide the information to the control device 170. In at least one implementation, the tracking system 280 only identifies data relating to the origination point of an emitter 125 relative to the tracking system 280, which data is sent to another module for further processing. In contrast, in at least one implementation, the tracking system 280 generates the data and analyzes the data to determine the location of the emitter relative to the entire system, before sending the data to the control device 170.

In at least one implementation, the ELG 150 can utilize an image sensor and image data to track the emitter 125. In particular, the ELG 150 can include one or more lens systems capable of adjusting the field of view of the signal that reaches the image sensor. In various implementations the ELG 150 can utilize one or more of the following sensing devices: a programmatically controllable LED receptor, an RF transceiver module, an accelerometer, a gyroscope, an altimeter, a digital compass, a GPS data, an acoustic reception device, and other similar sensors.

The ELG 150 can also include one or more filters that filters the information received by one or more the sensors. Useful filters may include narrow-pass filters, other band-pass filters, or IR (block) filters, which may be useful when a target object's 120 associated distinguishing feature may enable image tracking by the tracking system 280 and the control device 170 without the use of IR light. Useful filters may also include "dual-pass" filters, allowing a range of visible light, and a range of IR light, but no other light or signal. In at least one implementation, the ELG 150 or tracking device 140 may include a programmatically controllable filter changer device that swaps or switches filters depending upon control from a processor or a user.

Additionally, in at least one implementation, the ELG 150 can include various LED, radio frequency, acoustic, or other systems capable of communicating information from the ELG 150 to various devices within the tracking system 150. For example, the ELG 150 may utilize WI-FI or Bluetooth, or some other similar communication standard. Using such a communication standard, the ELG 150 can communicate various information to a control device 170, other ELG devices 150, a tracking device 140, a UI device 160, or some other device within the tracking system 100.

Figure 3:
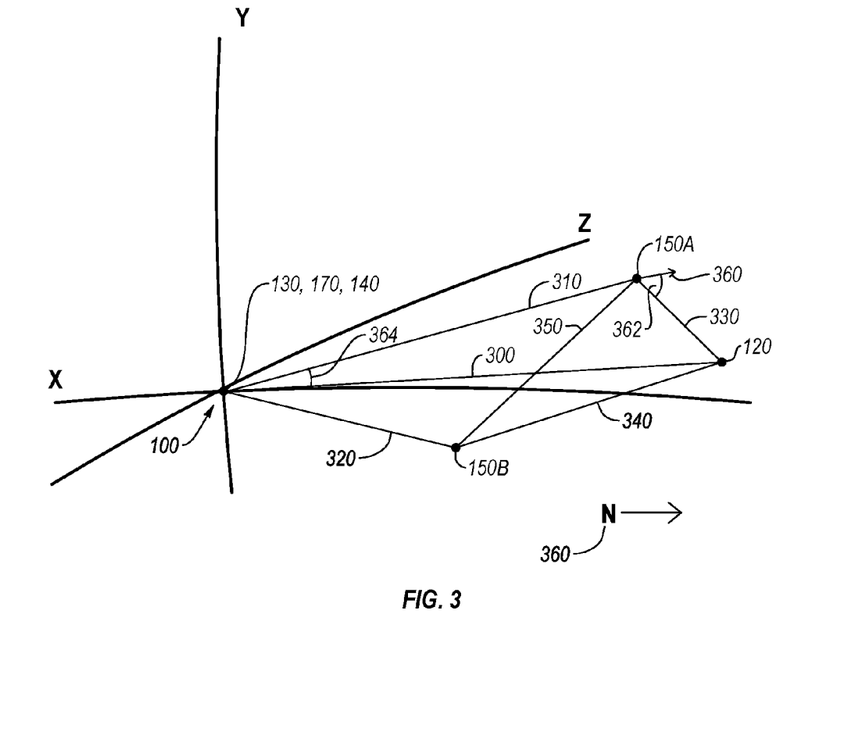
FIG. 3 illustrates a three-dimensional coordinate plane comprising various representations of implementations of components of the present invention.

For example, FIG. 3 depicts two ELGs 150A, 150B that are disposed within a three-dimensional environment 390. In addition to the ELGs 150A, 150B, a target object 120 and a tracking system 100 are present within the three-dimensional environment 390. The depicted tracking system 100 is shown as being located at the axis of the three-dimensional environment 390, but this is only for the sake of clarity. The depicted tracking system can include at least one or more of an audiovisual device 130, a tracking device 140, and a control device 170.

In at least one implementation, the tracking system 100 can be aware of the absolute location of the ELG's 150A, 150B through the use GPS or similar technologies and/or the tracking system 100 can be aware of the relative location of the ELG's 150A, 150B with respect to each other and to the system 100. In either case, in at least one implementation, the control device 170 is aware of at least the relative location of the ELGs 150A, 150B.

FIG. 3 further depicts that the devices can be aware of each other (depicted through use of lines 300, 310, 320, 340, 350 connecting the devices 150A, 150B, 100, 120 to each other). The lines 300, 310, 320, 340, 350 can represent communication pathways (e.g., IR, WIFI, LED, etc.) and/or simple awareness. For example, line 330 connecting ELG 150A with the target object may merely indicate that ELG 150A is aware of the location of the target object 120 relative to ELG 150A. Similarly, line 350 may indicate that ELG 150A and ELG 150B are aware of each others relative location.

When determining the location of a target object 120, in at least one implementation, ELG 150A can first identify the direction of north 360. ELG 150A can then identify an angular direction 362 between north 360 and the relative direction of the target object 120. This relative angular direction can be communicated to the control device 170. The control device 170 can also have access to a calculated relative angular direction between the control device 170 and the ELG 150A. Using both of these relative angular directions, the control device 170 can identify a proper direction to face an audiovisual device 130 such that the audiovisual device 130 is facing the target object 120. As previously discussed, however, in alternate embodiments the various components of the tracking system can comprise GPS unit, or other location gathering devices, that can aid in determining the location of the target object 120 within the three-dimensional space 390.

Accordingly, in at least one implementation, one or more ELGs 150 can be used to track a target object 120. In at least one implementation, the ELGs 150 can be used in combination with an integrated tracking device 140 that is equipped with either similar or different sensors from the one or more ELGs 150. The ELGs can assist in tracking an object with greater accuracy than would be achievable with just the tracking device 140. Additionally, providing external ELGs 150 that do not require a tracking device 140 to function may also lower the costs of a tracking system 100.

Figure 4:
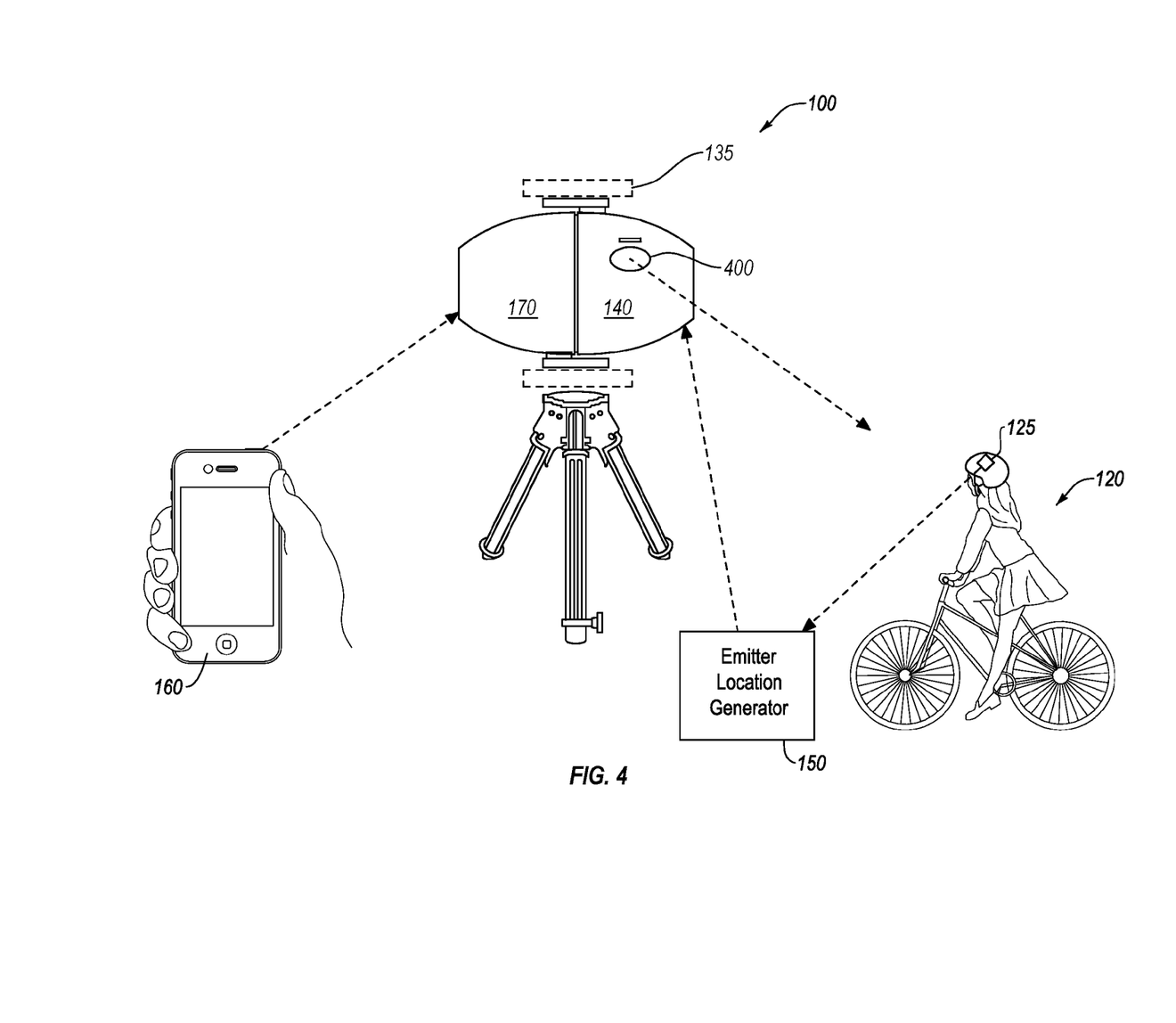
FIG. 4 illustrates a diagram of another implementation of a tracking system and a target in accordance with an implementation of the present invention.

Turning now to FIG. 4, in at least one implementation of a tracking system 280, a camera 400 can be integrated into the tracking device 140 itself. As such, the camera 400 can provide both tracking ability and the ability to capture and record the target object 120. Incorporating the camera 400 into the tracking system 280, as opposed to having a separate camera 130 that attaches to the tracking system 100, can provide a number of benefits. For example, an integrated camera 400 can provide the benefits of less equipment to carry around, shorter setup time, redundant video coverage in the event that the mounted camera's video is not good or is not sufficient, and other similar benefits. Additionally, such a system 100 may mount a light or microphone device (or both) to the tracking system 100, while an integrated camera 400 captures and record video data that has the accompanying benefit of enhanced audio and/or lighting.

In at least one implementation, the camera 400 can also track one or more of the following: faces, colors, shapes, RF signals, RF ID's, audio, GPS data, altimeter data, or other sensory data. The information gathered by the camera 400 can then be used to track a target object 120. Additionally, in at least one embodiment, the tracking system 100 can be in communication with a UI device 160, such as a smart phone. The information gathered by the camera 300, 130, or tracking system 280, can be communicated to the UI device 160, and then the UI device 160 can perform further processing on the data to identify, among other things, a relative location of the emitter 125. In at least one implementation, a detachable camera 130 can also be similarly used to track a target object 120.

Additionally, in at least one implementation, video and audio recorded by the camera 400 may be made available to other subsystems of tracking system 100. For example, the recorded video and audio may be used by mounting systems 240 to better record audio (in the case that the mounted device 242 is a microphone) or to light in better or different ways (as in the case when the mounted device 242 is a light). Similarly, multiple ELGs 150 may share video or audio obtained by the ELG 150.

The various data gathered by the integrated camera 400 (or in some implementations, an attached camera 130) can be analyzed by a processing unit, such as an FPGA, an integrated processor, or an external processors (e.g., UI device processor). The processing unit can then derive information to affect one or more of the subsystems 250, 240, 220, 170, 280, 210 within the tracking system 100.

Figure 5:
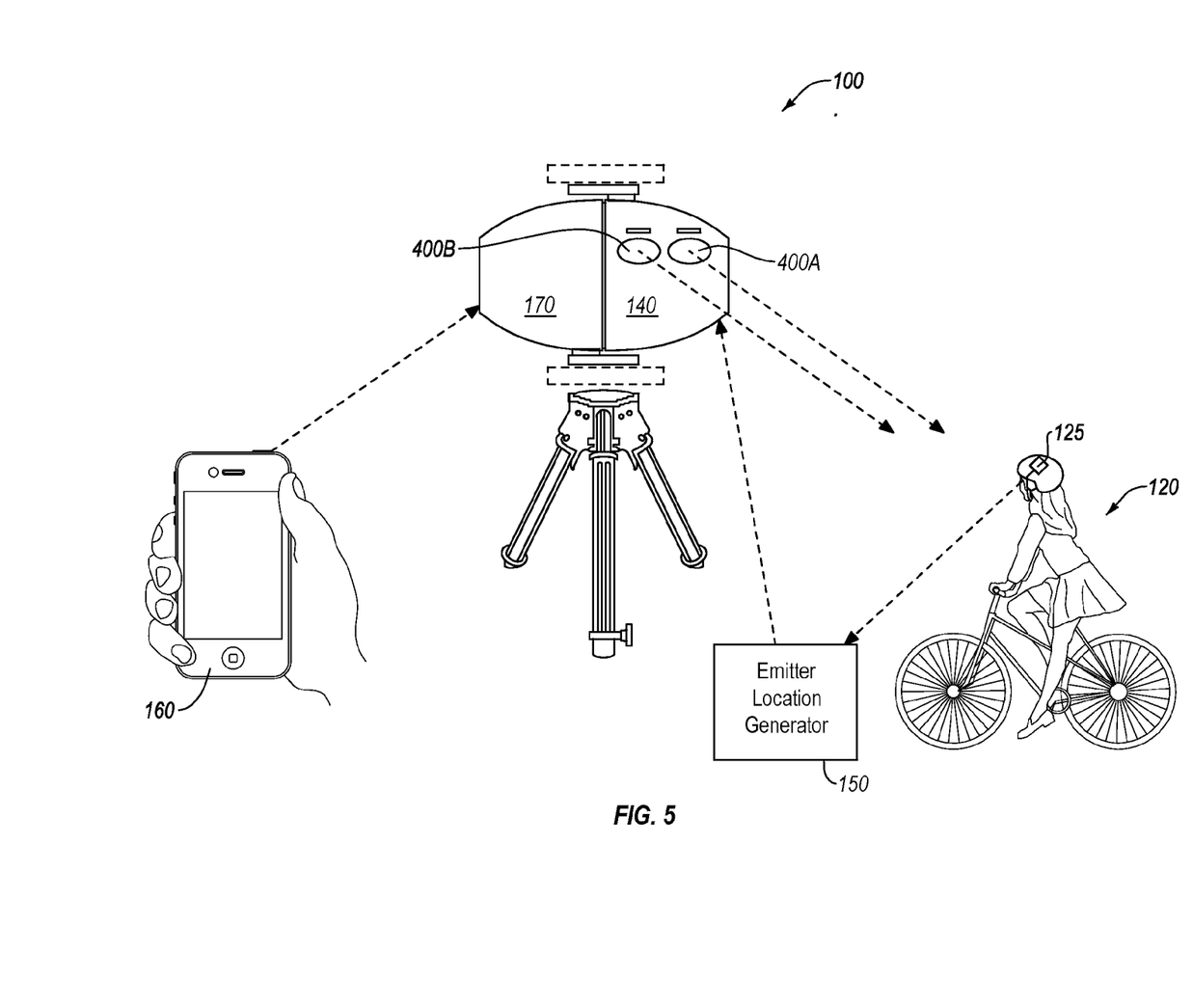
FIG. 5 illustrates a diagram of yet another implementation of a tracking system and a target in accordance with an implementation of the present invention.

In addition to having a single integrated camera 400, in at least one implementation, multiple integrated cameras 400 can be incorporated into a tracking system 100. For example, FIG. 5 depicts an embodiment of a tracking system 100 that comprises a first camera 400A and a second camera 400B. Using multiple cameras 400 can provide multiple benefits. For example, utilizing the first and second camera 400A, 400B can allow a tracking system 100 to also calculate visual distance and depth measurements. Once a distance and/or depth factor is known, the recorded footage can be adjusted such that the target object 120 is properly framed within the footage.

Additionally, the first camera 400A and the second camera 400B may together aid a tracking system in performing facial recognition. In at least one implementation, it may be desirable for a tracking system 100 to identify and focus on a target object's 120 face. For instance, one can imagine a case where an emitter 125 may be attached to a person's belt. In most cases, it would like be more desirable to target on a person's face using facial recognition software than it would be to focus on the belt.

Further, in at least one implementation of a tracking system with multiple integrated cameras 400 provides the components necessary to have one camera 400A performing tracking functions while another camera 400B records the target object 120. Additionally, one camera 400A can be configured to identify objects in the IR spectrum, for example, while the other camera 400B can be configured to record standard video data. Additionally, using two cameras 400A, 400B to simultaneously record a target object 120 can produce 3D formatted footage.

Accordingly, one or more implementations of using data received by one or more integrated cameras 400 or mounted cameras 130 can provide at least one or more of any of the following benefits: (1) to light one or more target objects 120 differently or better, (2) to record audio of a one or more target objects 120 differently or better, (3) to track one or more target objects 120 differently or better, (4) to record video of one or more target objects 120 differently or better, (5) to communicate to and move a camera via a grip system 250 differently or better for one or more tracking systems 280 or target objects 120, 6) triangulating or adjusting one or more tracking system 180 in more accurate or responsive ways, or 7) three-dimensional recorded footage. Additional benefits that can be provided by an implementation of a camera 300, 130 used to aid in tracking include (1) location of a target object 120, (2) speed of a target object 120, (3) acceleration of a target object 120, (4) orientation in 3D space including the facing of a target object 120, (5) light measurements associated with a target object 120, (6) sound or audio associated with a target object 120, (7) other sensory data associated with a target object 120 or associated emitter 215, and (8) video associated with a target object 120.

Accordingly, FIGS. 1-5 and the corresponding text illustrate or otherwise describe one or more components, modules, and/or mechanisms for tracking a target object with an audiovisual device. One will appreciate that implementations of the present invention can also be described in terms of methods comprising one or more acts for accomplishing a particular result. For example, FIG. 6 and the corresponding text illustrates a flowchart of a sequence of acts in a method for tracking a target object with an audiovisual device. The acts of FIG. 6 are described below with reference to the components and modules illustrated in FIGS. 1-5.

Figure 6:
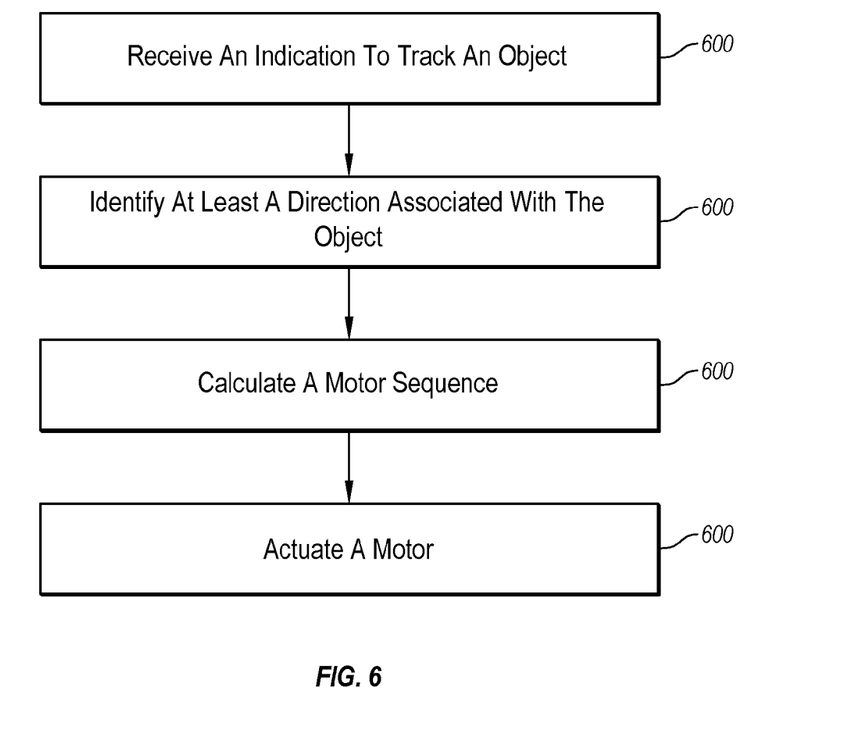
FIG. 6 illustrates a flowchart depicting a series of acts in a method for performing a method in accordance with an embodiment of the present invention.

For example, FIG. 6 illustrates that a method for tracking a target object with an audiovisual device can comprise an act 600 of receiving an indication to track an object. Act 600 includes receiving an indication to track a particular identifier, wherein the particular identifier is associated with an object of interest. For example, in FIG. 1 and the accompanying description, the tracking device 140 and ELG 150 both receive an indication to track emitter 125, which is associated with a boy on a bicycle.

FIG. 6 also shows that the method can comprise an act 610 of identifying at least a direction associated with the object. Act 610 includes identifying, using at least one tracker component, at least a direction associated with an origination point of an occurrence of the particular identifier. For example, in FIG. 1 and FIG. 3 and the corresponding description, both the ELGs 150 and the tracking device 140 are able to identify at least a direction (e.g., 362) that is associated with the emitter 120, 125, which is the origination point of the signal.

Additionally, FIG. 6 also shows that the method can comprise an act 620 of calculating a motor sequence. Act 620 includes calculating, based upon the indication of at least a direction associated with an origination point of an occurrence of the particular tracking signal, a motor actuation sequence necessary to actuate a control component to track the object of interest with an audiovisual device. For example, FIG. 1 and the accompanying description describe a motor actuation sequence to track the object. In particular, tracking the motor actuation sequence can involve determining a necessary rotation needed to track the target object 120. The control unit 170 can determine that number of "clicks" necessary to make the required turn.

Further, FIG. 6 shows that the method can comprise an act 630 of actuating a motor. Act 630 can include actuating at least one motor to track the object of interest. For example, FIG. 1 and the accompanying text describe and depict a control device 170 tracking an emitter 125 attached to a boy on a bicycle 120.

As such, one or more implementations of the present invention provide systems, apparatus, and methods for tracking a target object 120 with a tracking system. In particular, the target object 120 can be tracked using multiple discrete tracking units (e.g., ELGs 150) that are physically separate from the control device 170. Additionally, in at least one implementation, the system can comprise a variety of camera configurations adapted for particular circumstances. For example, a camera can be integrated into the tracking device 140 such that the camera provides tracking data to the control device 170 and no additional camera is required. Further, in at least one implementation, the system can comprise multiple cameras that provide depth information to the system, along with other above listed benefits.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for tracking a cinematography target, the system using multiple components to identify and track the target, the system comprising:
   an emitter configured to attach to a target and to emit a tracking signal, the emitter comprising:
      an output module configured to emit the tracking signal, wherein the tracking signal comprises one or more identifiable signals;
   a tracker configured to receive the tracking signal from the emitter and to track the emitter based upon the received tracking signal, the tracker comprising:
      a receiver module configured to receive the tracking signal and to identify the one or more identifiable signals,
      wherein the tracker comprises a distinct component that is physically separate from the emitter and a control module,
   the control module configured to identify a location of the target and to position an audiovisual device to align with the target; and
   a user interface device configured to receive commands from a user and communicate the commands to the tracker, wherein at least one user command initializes custom tracking behavior in the tracking system, the custom tracking behavior being applied during a user-specified set of circumstances.

2. The system as recited in claim 1, wherein the tracker comprises a plurality of distinct components, each of which are physically separate from each other and from the emitter and control module.

3. The system as recited in claim 1, wherein the tracker is configured to communicate information relating to the received tracking signal to the control module.

4. The system as recited in claim 1, wherein the tracker is configured to communicate information to the control module relating to the location of the tracker relative to the control module.

5. The system as recited in claim 1, wherein the tracker comprises both a distinct component that is physically separate from the emitter and the control module and a component that is physically integrated with the control module.

6. The system as recited in claim 1, wherein the tracker comprises a sensory component that is configured to capture and record video data.

7. The system as recited in claim 6, wherein the sensory component is physically integrated into the tracker.

8. The system as recited in claim 1, wherein two cameras are attached to the control module.

9. A computer-implemented method at a tracking device for tracking a cinematography target that has been associated with an emitter, the method comprising:
   receiving at the tracking device an indication to track a particular identifier, wherein the particular identifier is associated with an object of interest;
   identifying, using at least one tracker component, at least a direction associated with an origination point of an occurrence of the particular identifier;
   calculating, based upon the indication of at least a direction associated with an origination point of an occurrence of the particular tracking signal, a motor actuation sequence necessary to actuate a control component to track the object of interest with an audiovisual device that is physically integrated within the at least one tracker component, wherein the motor actuation sequence is determined based on custom tracking behavior initiated by a user, the custom tracking behavior being applied during a user-specified set of circumstances; and
   actuating at least one motor to track the object of interest using an integrated camera.

10. The method as recited in claim 9, wherein the at least one tracker component is a discrete component that is physically separate from the control component.

11. The method as recited in claim 10, wherein a plurality of discrete tracker components are disposed throughout a geographic space, and further wherein one or more of the plurality of tracker components are in communication with the control component.

12. The method as recited in claim 9, wherein the particular identifier comprises a signal that is broadcast from an emitter that is attached to the object of interest.

13. The method as recited in claim 9, wherein the audiovisual reception device comprises two cameras.

14. The method as recited in claim 9, further comprising:
identifying, using the audiovisual reception device, the at least the direction associated with the origination point of the occurrence of the particular identifier.

15. The method as recited in claim 9, wherein the at least one tracker component comprises both a distinct component that is physically separate from the control component and a component that is physically integrated with the control component.

16. The method as recited in claim 15, wherein the at least one tracker component that is physically separate from the control component comprises a camera that is used for tracking the particular identifier.

17. The method as recited in claim 9, further comprising:
   accessing at least one camera that is physically integrated with the tracker component;
   identifying, using the at least one camera, the at least the direction associated with the origination point of the occurrence of the particular identifier.

18. A computer program product for use at a computer system, the computer program product comprising one or more computer storage media having stored thereon computer-executable instructions that, when executed at a processor, cause the computer system to perform a method for tracking a cinematography target that has been associated with an emitter, the computer program product, comprising:
   receiving an indication at a tracking device to track a particular identifier, wherein the particular identifier is associated with an object of interest;
   identifying, using at least one tracker component, at least a direction associated with an origination point of an occurrence of the particular identifier;
   calculating, based upon the indication of at least a direction associated with an origination point of an occurrence of the particular tracking signal, a motor actuation sequence necessary to actuate a control component to track the object of interest with an audiovisual device that is physically integrated within the at least one tracker component, wherein the motor actuation sequence is determined based on custom tracking behavior initiated by a user, the custom tracking behavior being applied during a user-specified set of circumstances; and
   actuating at least one motor to track the object of interest using an integrated camera.

* * * * *